United States Patent
Kemmerer et al.

(10) Patent No.: US 9,906,463 B2
(45) Date of Patent: Feb. 27, 2018

(54) SYSTEMS AND METHODS FOR INTELLIGENT NETWORK EDGE TRAFFIC AND SIGNALING MANAGEMENT

(75) Inventors: Frederick Charles Kemmerer, Hollis, NH (US); Paul Nelson Miller, Derry, NH (US); Iain Edward Sharp, Berkshire (GB)

(73) Assignee: GENBAND US LLC, Plano, TX (US)

( * ) Notice: Subject to any disclaimer, the term of this patent is extended or adjusted under 35 U.S.C. 154(b) by 757 days.

(21) Appl. No.: 13/412,007

(22) Filed: Mar. 5, 2012

(65) Prior Publication Data

US 2013/0064080 A1    Mar. 14, 2013

Related U.S. Application Data

(60) Provisional application No. 61/449,068, filed on Mar. 3, 2011.

(51) Int. Cl.
  *H04L 12/911* (2013.01)
  *H04L 12/801* (2013.01)
  *H04L 29/06* (2006.01)

(52) U.S. Cl.
  CPC .......... *H04L 47/781* (2013.01); *H04L 47/10* (2013.01); *H04L 47/822* (2013.01); *H04L 47/14* (2013.01); *H04L 47/824* (2013.01); *H04L 65/1026* (2013.01)

(58) Field of Classification Search
  CPC ..... H04L 47/10; H04L 47/14; H04L 65/1026; H04L 65/1063; H04L 47/20; H04W 28/16; H04W 24/08; H04W 92/14
  USPC ................... 370/230, 252; 455/422
  See application file for complete search history.

(56) References Cited

U.S. PATENT DOCUMENTS

| | | | |
|---|---|---|---|
| 6,882,709 B1 | 4/2005 | Sherlock et al. |
| 7,636,578 B1 | 12/2009 | Cope et al. |
| 7,694,127 B2 | 4/2010 | Adams et al. |
| 7,903,661 B2 | 3/2011 | Biswas et al. |
| 2006/0085832 A1 | 4/2006 | Groff et al. |
| 2006/0239255 A1 | 10/2006 | Ramachandran et al. |
| 2008/0104630 A1 | 5/2008 | Bruce et al. |
| 2008/0108348 A1 | 5/2008 | Kottilingal et al. |
| 2008/0159136 A1 | 7/2008 | Mallesan |
| 2008/0162720 A1 | 7/2008 | Gulati et al. |
| 2008/0168503 A1 | 7/2008 | Sparrell |

(Continued)

OTHER PUBLICATIONS

Related application: Subhra Saha et al.; Adaptive Intelligent Optimal Registration Interval Determination Algorithm Ensuring High Availability, filed Dec. 29, 2008 as U.S. Appl. No. 61/141,008.

(Continued)

*Primary Examiner* — Charles C Jiang
*Assistant Examiner* — Oussama Roudani
(74) *Attorney, Agent, or Firm* — Haynes and Boone, LLP

(57) ABSTRACT

Systems and methods for intelligent network edge traffic and signaling management are disclosed. According to an aspect, a method for controlling network edge traffic may include receiving network traffic flow information from a network element. The method may also include determining a control command for a network edge element based on the network traffic flow information. Further, the method may include communicating the control command to a network for control of network traffic at an edge.

15 Claims, 9 Drawing Sheets

(56) References Cited

U.S. PATENT DOCUMENTS

2009/0003315 A1    1/2009  Devdhar et al.
2012/0087260 A1*   4/2012  Devarapalli et al. ......... 370/252

OTHER PUBLICATIONS

Related application: Robert Denman et al.; Systems and Methods for Enabling Personalization of Data Service Plans filed Nov. 16, 2010 as U.S. Appl. No. 61/414,272.
Related application: Nalin Mistry et al.; Integrating Telephony Applications and Television Broadcasts on a Multimedia Device filed May 16, 2008 as U.S. Appl. No. 61/053,782.
Related application: Robert Denman et al.; Systems and Methods for Dynamic Congestion Management in Communications Networks filed Dec. 6, 2010 as U.S. Appl. No. 61/420,272.
Related application: Frederick Kemmerer et al.; Systems and Methods for Intelligent Network Edge Traffic and Signaling Management filed Mar. 3, 2011 as U.S. Appl. No. 61/449,068.
Related application: Subhra Saha et al.; Adaptive Intelligent Optimal Registration Interval Determination Algorithm Ensuring High Availability, filed Mar. 14, 2009 as U.S. Appl. No. 12/404,286, now issued as U.S. Pat. No. 7,945,663 on May 17, 2011.
Related application: Robert Denman et al.; Systems and Methods for Enabling Personalization of Data Service Plans, filed Aug. 31, 2011 as U.S. Appl. No. 13/222,807.
Gill, Phillipa et al., "YouTube Traffic Characterization: A View From the Edge", IMC '07, Oct. 24-26, 2007, San Diego, California, USA, 14 pages.
"Amdocs Policy Controller/PCRF" found at <http://www.bridgewatersystems.com/Policy-Controller.aspx> copyright 1996-2009, Bridgewater Corporation, printed Jan. 16, 2012, 2 pages.
"Bytemobile—Reduce Data Traffic—Lossy Media Optimization" found at <http://archive.org/web/2010102605027/http://bytemobile.com/products-applications/mfs-lossy-media-optimization.html>, on the Internet archive, copyright 2010, Bytemobile, Inc., printed Jan. 16, 2012, 1 page.
"Genband: Traffic & Policy Management" found at <http://genband.com/products/traffic-policy-management.com>, copyright 2012 Genband, printed Jan. 16, 2012, 1 page.

"MDX 9000 Series Media Distribution Switch", found at <http://web.archive.org/web/20100731024602/http://verivue.com/products-verivue-media-distribution-platform-content-distribution-switch.asp>, on the Internet archive, copyright 2010, Verivue, Inc., printed Jan. 16, 2012, 1 page.
"Putting Policy Control to Work", found at <http://www.fiercewireless.com/story/putting-policy-control-work/2010-09-27-0>, copyright 2011, FierceMarkets, printed Jan. 16, 2012, 3 pages.
Related application: Nalin Mistry et al.; Integrating Telephony Applications and Television Broadcasts on a Multimedia Device, filed Dec. 9, 2008 as U.S. Appl. No. 12/330,899.
Corresponding non-final Office Action and accompanying PTO-892 dated Jan. 26, 2012 for related U.S. Appl. No. 12/330,899 listed above.
Corresponding Applicant's response filed Feb. 20, 2012 to Jan. 26, 2012 Office Action for related U.S. Appl. No. 12/330,899 listed above.
Related application: Robert Denman et al.; Systems and Methods for Dynamic Congestion Management in Communications Networks filed Dec. 6, 2011 as U.S. Appl. No. 13/312,436.
Related application: Kemmerer et al.; Systems and Methods for Intelligent Network Edge Traffic and Signaling Management filed Mar. 5, 2012 as U.S. Appl. No. 13/412,007.
Related application: Dany Sylvain et al.; Methods, Systems, and Computer Readable Media for Deriving User Availability From User Context and User Responses to Communications Requests filed Jul. 12, 2011 as U.S. Appl. No. 13/180,577.
Related application: Subhra Saha et al.; Adaptive Intelligent Optimal Registration Interval Determination Algorithm Ensuring High Availability filed Dec. 18, 2009 as PCT/US09/68723 and published as WO 2010/078076 on Jul. 8, 2010.
Written Opinion/ISR dated Aug. 3, 2010 for related application PCT/US09/68723 filed Dec. 18, 2009.
J. Lin, The multi-agent rendezvous problem—Part I, Journal on Control and Optimization, 2005.
Venkat Anantharam et al., IEEE Trans on comm., Burst Reduction Properties of the Leaky Bucket Flow Control Scheme in ATM Networks, Dec. 1994, vol. 42, No. 12.
Related Chinese application: CN 200910215530.7 filed Dec. 28, 2009, now abandoned. (Based on U.S. priority U.S. Appl. No. 61/141,08 and U.S. Appl. No. 12/404,286.).

* cited by examiner

SYSTEMS AND METHODS FOR INTELLIGENT NETWORK EDGE TRAFFIC AND SIGNALING MANAGEMENT

CROSS REFERENCE TO RELATED APPLICATION

This application claims the benefit of U.S. provisional patent application No. 61/449,068, titled SYSTEMS AND METHODS FOR INTELLIGENT NETWORK EDGE TRAFFIC AND SIGNALING MANAGEMENT and filed Mar. 3, 2011, the disclosure of which is incorporated herein by reference in its entirety.

TECHNICAL FIELD

The presently disclosed subject matter relates to communications networks. Particularly, the presently disclosed subject matter relates to systems and methods for intelligent network edge traffic and signaling management.

BACKGROUND

Traffic flow and deep packet inspection technology has been deployed in networks for implementing traffic and policy management (TPM). Such technology may be used for controlling congestion. For example, in a mobile network, edge congestion may be controlled by deploying TPM systems at the Gi interface. Congestion can occur, for example, at radio access network (RAN) edge equipment such as a NodeB and a radio network controller (RNC). Further, congestion may occur on specific RAN segments, and not others, i.e., on certain NodeB elements but not necessarily all, or certain RNC elements but not necessarily all. Congestion may also manifest itself via link congestion on Iub interfaces, Iu interfaces, or Gn interfaces throughout the network, causing signaling and traffic latency or even loss. Further, congestion may manifest itself via computational overload of the network elements themselves, such as a serving GPRS support node (SGSN), an RNC, and/or a NodeB, due to the aggregate bitrate of congested traffic levels and/or the increased frequency of signaling messages.

Congestion may be due to the dynamics of an access network hierarchy, where individual cell sites, and other RAN equipment can become overloaded either in bandwidth utilization, or in signaling computational load due to the geographical deployment, number of users, and type of traffic traversing the system. It is noted that this problem exists for many network types, and is not limited solely to the aforementioned example. For example, cable networks can have access level congestion at a data over cable service interface specification (DOCSIS)/cable modem termination system (CMTS) and MTA access layer, prior to extraction of pure IP and aggregation to internet core infrastructure. In another example, mobile networks, such as 3G and 4G, can have access level congestion at the RAN. In yet another example, xDSL networks can have access level congestion affecting the digital subscriber line access multiplexer (DSLAM) network access provider (NAP) prior to aggregation at the NSP termination to internet core infrastructure. Congestion difficulties may also arise in other wireless network architectures such as the 4G LTE network architecture where GGSN, SGSN, RNC and NodeB become upgraded to P-GW, S-GW, and e-NodeB running upgraded management protocols.

The emergence of congestion is a dynamic (real-time) event that causes significant cost impacts to a network operator on infrastructure equipment, network management costs, and loss of subscribers due to dissatisfaction regarding network performance. In particular, the emergence of advanced IP based endpoints or user equipment (UE) such as smartphones, smart-TVs, tablet computing devices, and laptops continuously increases the signaling and traffic load on the network, creating an ever increasing congestion problem for the network operator. Existing solutions require gross macro level traffic throttling and costly infrastructure scale improvements to manage the increased traffic. As the traffic congestion may dynamically appear on any network segment, often network-wide infrastructure costs are impacted. Access level congestion can make it difficult for an operator to ensure the quality of experience (QoE) of the end user, ensure fair traffic handling across all users of the network, and cost effectively manage network infrastructure.

Accordingly, in view of the foregoing, it is desired to provide improved techniques for network traffic and signaling management.

SUMMARY

Systems and methods for intelligent network edge traffic and signaling management are disclosed. According to an aspect, a method for controlling network edge traffic may include receiving network traffic flow information from a network element. The method may also include determining a control command for a network edge element based on the network traffic flow information. Further, the method may include communicating the control command to a network for control of network traffic at an edge.

According to another aspect, a method for controlling network edge traffic may be implemented at a first network element. The method may include communicating network traffic flow information to a second network element. The method may also include receiving a control command from the second network element, wherein the control command is generated based on aggregated network traffic flow information. Further, the method may include controlling network traffic at an edge based on the control command.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
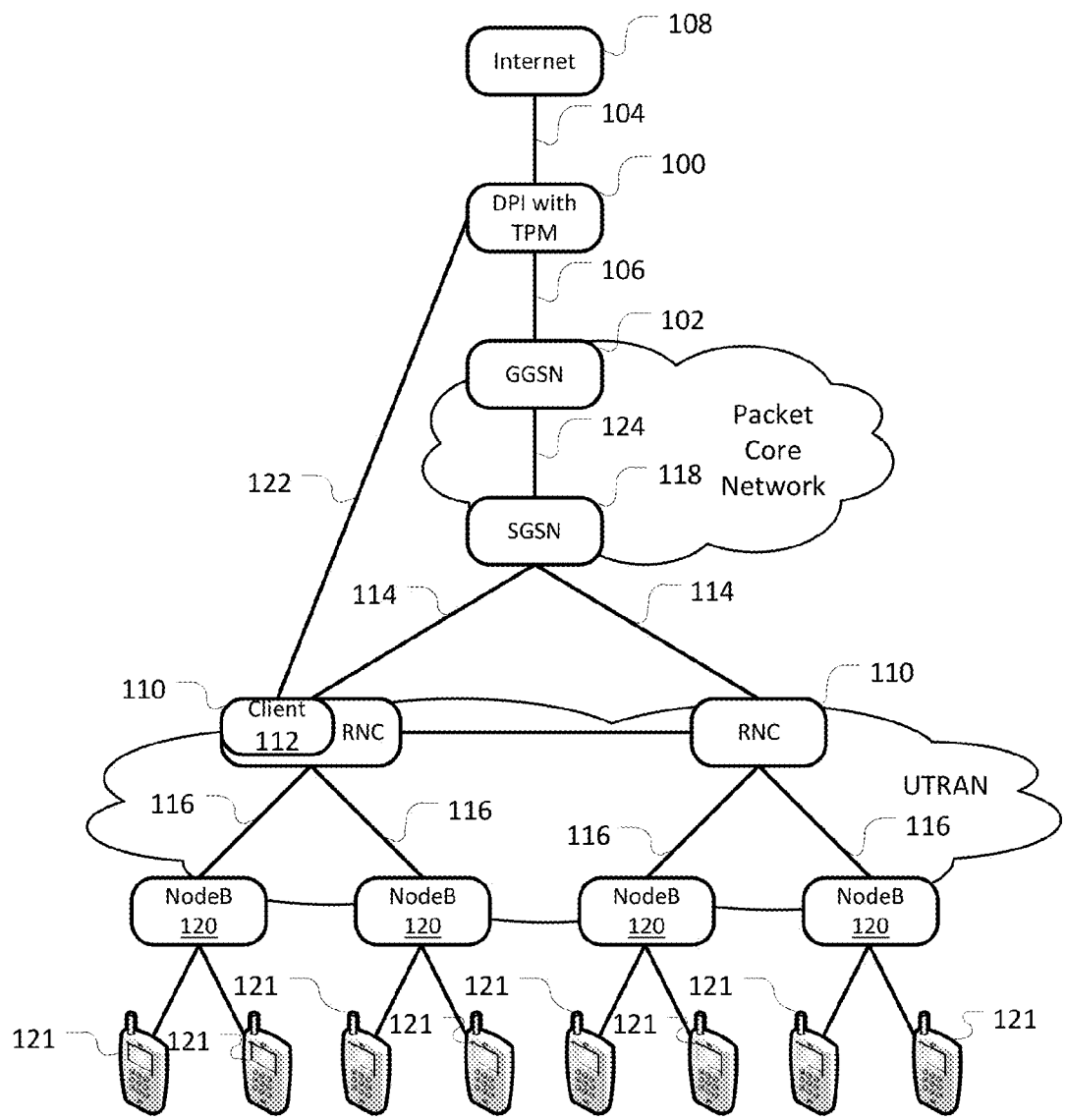
FIG. 1 is a diagram of an example system for controlling network edge traffic in accordance with embodiments of the present disclosure.

FIG. 1 illustrates a diagram of an example system for controlling network edge traffic in accordance with embodiments of the present disclosure. Referring to FIG. 1, the system provides an edge based dynamic congestion and quality of service (QoS) solution that combines real-time data on radio congestion status, user status, and internet protocol (IP) flow characteristics. Further, the system provides control of user traffic, network access, and signaling at the edge.

A DPI module 100 having a TPM function is deployed in the network core behind a GGSN 102 on a Gi (GGSN-to-PDN (public data network) interface) 104, 106, where IP flow is aggregated. The DPI module 100 can manage IP flows to and from the internet 108. In one or more embodiments, one of the RNCs 110 is extended with a client 112 to enable TPM awareness and control of RAN bandwidth allocation. The TPM function of the DPI module 100 may maintain awareness of Iu 114, Iub 116, and RAN network equipment (e.g., the RNCs 110, an SGSN 118, and nodeBs 120 in communication with user equipment 121, which may be smart phones or other computing devices capable of wireless communication) congestion issues. Awareness of the congestion issues may be made through a communication link 122 established between the DPI module 100 and the RAN-based client 112. The communication link 122 may be out of band as described in this embodiment, or inserted in existing flows down to the RNC 110 via existing IP connections. The client 112 may report statistics for analysis by the TPM function of the DPI module 100, as well as perform manipulation of wireless protocols to affect congestion management of QoS controlled IP flows, such as those controlled by a radio access bearer, a GPRS tunneling protocol (GTP) tunnel, and a PDN context or equivalent as managed by the wireless architecture as deployed. Further, because the TPM function of the DPI module 100 is deployed at an aggregated position of the network and is application layer aware, this traffic management solution can combine the application awareness with dynamic congestion awareness for benefits to network traffic and signaling management.

Communication between the TPM function of the DPI module 100 and the client 112 implemented at the RNC 110 at the RAN edge may be implemented by any suitable method. For example, the communication may be implemented out of band via a direct IP communication link 122, with a new protocol, or may occur via existing protocols thought the current network architecture via Gi 102, 104, the Iu 114, and Gn 124 via enhancement of these existing protocols. The communication between the TPM function of the DPI module 100 and the client 112 may pass network traffic flow information from the client 112 to the TPM function, and may pass control or enforcement commands from the TPM function to the client 112. Further, communication established between the TPM function and the client 112 may be used for managing and controlling other functions such as, but not limited to, software upgrade, diagnostics, or other nominal functionality to manage the distributed system.

Figure 2:
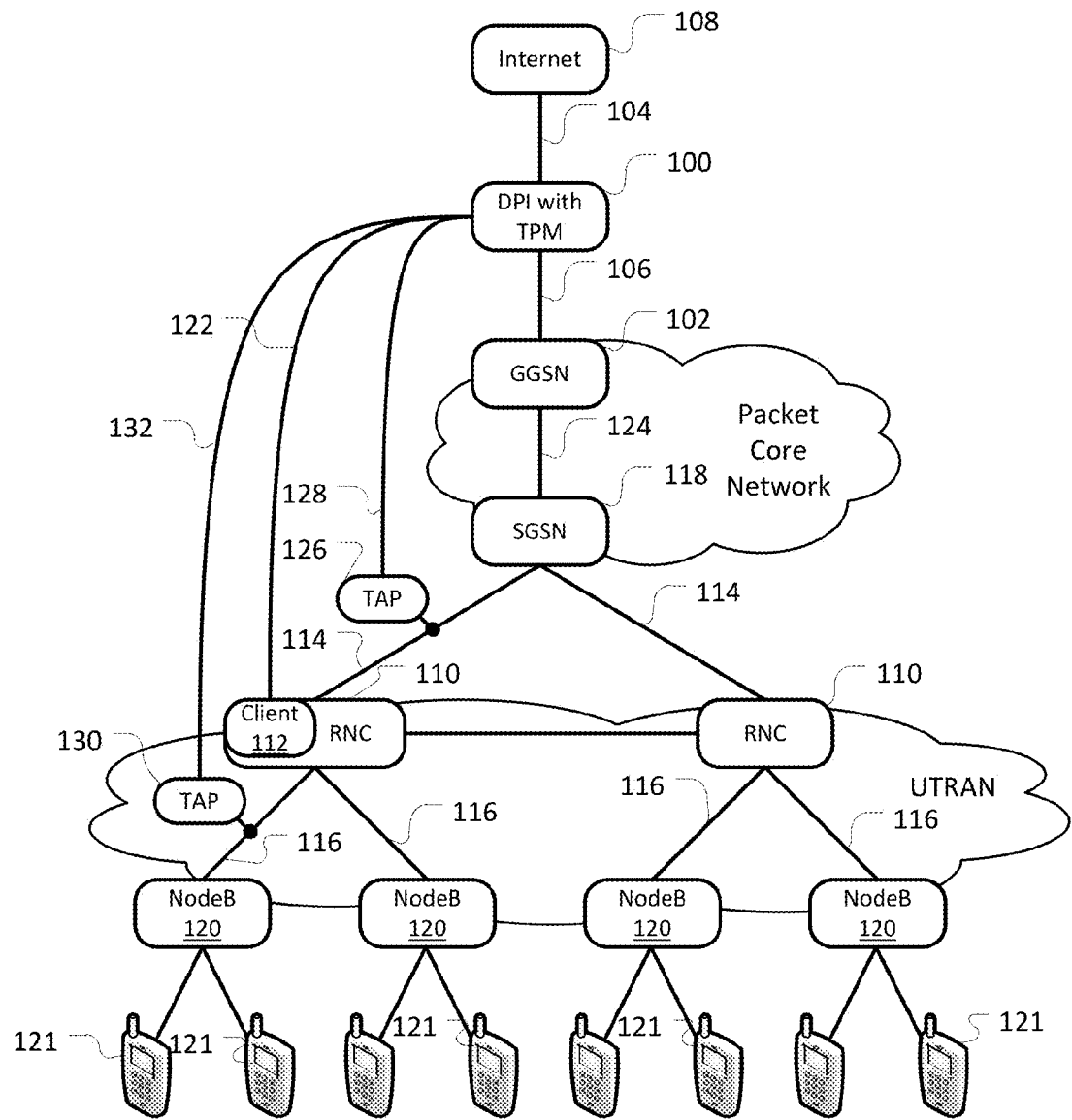
FIG. 2 is a diagram of another example system for controlling network edge traffic in accordance with embodiments of the present disclosure.

FIG. 2 illustrates a diagram of another example system for controlling network edge traffic in accordance with embodiments of the present disclosure. Referring to FIG. 2, the system of this example utilizes various techniques to obtain RAN awareness. For example, RAN awareness may be obtained via network taps on signaling protocols such as, but not limited to, the Iu 114 via a tap 126 providing information about the RAN network to the TPM module of the DPI 100 via an interface 128. Interface 128 may contain a filtered set of information if the tap 126 is active and processing information, or may contain a duplicate of the Iu interface traffic on the Iu 114. Further, network taps on Iub 116 may be implemented via the tap 130, providing information via an interface 132 to the TPM module of the DPI module 100. By these various communication links, network traffic flow information may be communicated from these network elements to the TPM function, and control or enforcement commands may be communicated from the TPM function to the network elements.

Figure 3:
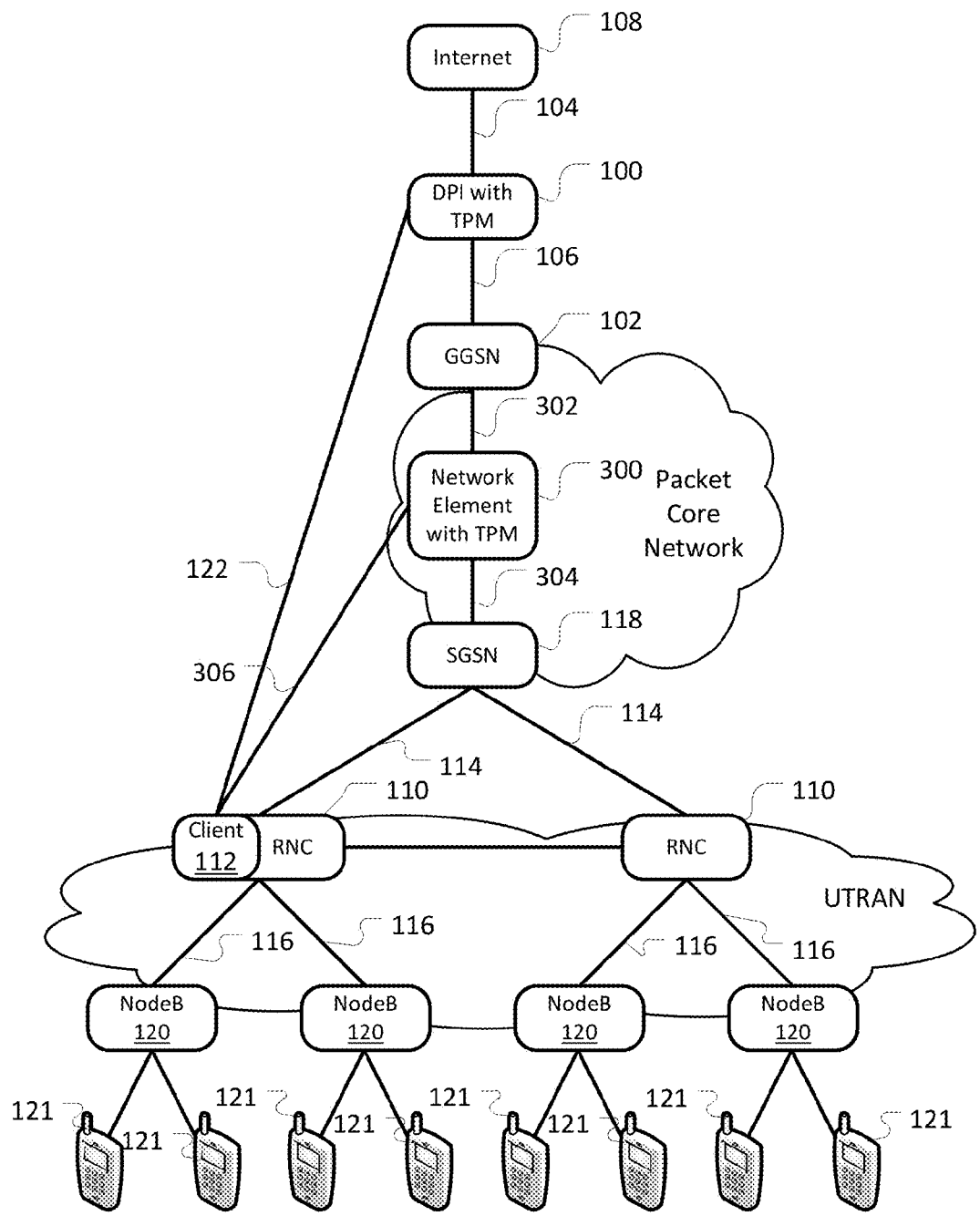
FIG. 3 is a diagram of another example system for controlling network edge traffic in accordance with embodiments of the present disclosure.

FIG. 3 illustrates a diagram of another example system for controlling network edge traffic in accordance with embodiments of the present disclosure. Referring to FIG. 3, the TPM function at the DPI module 100 may work in coordination with another TPM function within a network element 300 positioned at a Gn interface 302, 304, thereby reducing the amount of information required from the RAN based client 112 and/or enhancing the traffic management functions by performing it directing on the Gn interface 302, 304. Further, the TPM function implemented at the network element 300 may be implemented without implementation of the TPM function at the DPI module 100. In either scenario, each TPM function may be connected via its interface at the communication link 122 and/or another communication link 306 as suitable to the RAN edge for becoming aware of the RAN edge network conditions, and to affect traffic control at that position. By these techniques, network traffic flow information may be communicated to the TPM functions, and control or enforcement commands may be communicated from the TPM functions to the network elements.

In accordance with embodiments of the present disclosure, traffic enforcement may occur in TPM functions at the network core, and/or at RAN edge equipment so enabled by one or more clients. Positions to locate equipment for traffic control may depend on the application, IP flow, congestion being experienced in the network, the like, and combinations thereof. The TPM function may determine a location and/or control command for enforcement, and may apply the determination to achieve desired or optimal traffic flow.

Figure 4:
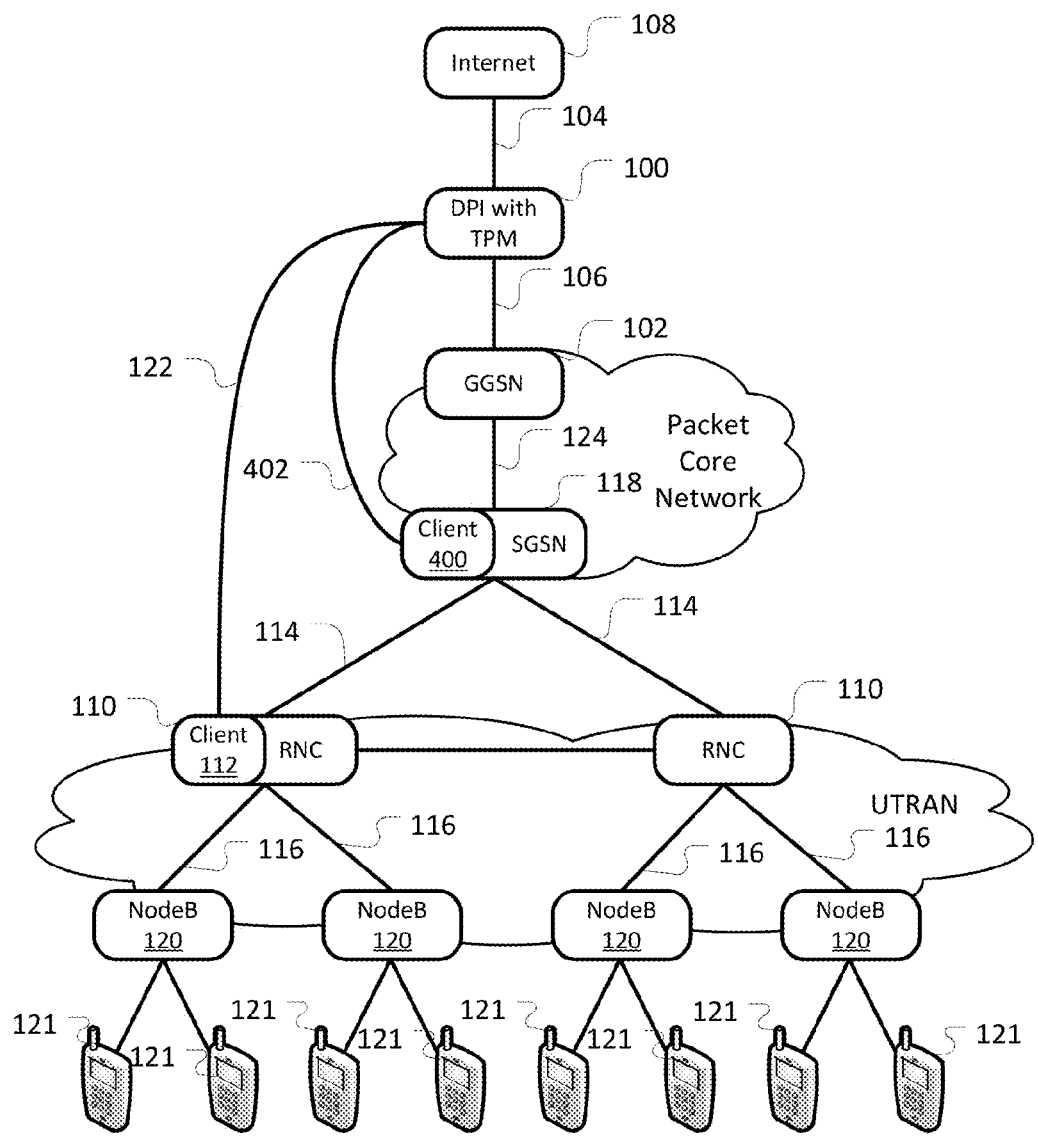
FIG. 4 is a diagram of another example system for controlling network edge traffic in accordance with embodiments of the present disclosure.

FIG. 4 illustrates a diagram of another example system for controlling network edge traffic in accordance with embodiments of the present disclosure. Referring to FIG. 4, the TPM function of the DPI module 100 may communicate with clients at different levels in the RAN hierarchy to obtain information and affect traffic control. For example, the TPM function may communicate with the client 114 in accordance with embodiments of the present disclosure. Further, the TPM function may communication with a client 400 implemented in the SGSN 118 and configured to communicate via the communication link 402, which may be in band or out of band, to augment and/or replace the communication link 122 communicating between the TPM function and the RNC 110 for communicating network traffic flow information may be communicated to the TPM functions and communicating control or enforcement commands.

In accordance with embodiments of the present disclosure, extension of TPM communications to client enhanced network elements as disclosed herein may be implemented in nodeBs, GGSNs, and/or other active network equipment to provide network information and control commands to affect traffic control and to provide analytics to a network operator.

A client, such as clients 112 and 400, may be implemented by software, hardware, firmware, or combinations thereof. For example, a client may be a dedicated software function or an enhancement of an existing protocol in order to provide communications to inform a TPM module with RAN awareness, and to respond to TPM commands issued for traffic control. Further, a client may have network element capability, and may be implemented in various ways, such as software upgrade, protocol upgrade, system addition, and the like.

In embodiments of the present disclosure, core network intelligence associated with data and signaling flows may be coupled with edge network mechanisms for enforcing it. Implementations may include a protocol from the core to the edge device by coupling techniques disclosed herein to DPI techniques. Such techniques may be augmented by content caching at the core.

Example networks to which embodiments of the present disclosure may be applied include, but is not limited to, cable, DSL, mobile (e.g., 3G and 4G), and the like.

Various controls may be issued for implementing embodiments of the present disclosure. For example, bearer (user) path bandwidth may be controlled. Signaling may be controlled from an endpoint. Intelligence of the TPM module may be endpoint device type aware, endpoint application aware, endpoint device type aware, edge network architecture topology aware, and the like. Further, for example, techniques for enforcement may include controlling per IP flow throughput, controlling aggregate endpoint or network element throughput, enforcing protected QoS levels for QoE enhancement, the like, and combinations thereof. In an example, QoS opt-in management (e.g., guaranteed QoS or tiered offerings) may be provided.

In one or more embodiments, information may be provided by reading back edge-specific real time information not obtainable by inspection of an IP flow at the core. Examples include, but are not limited to, MAC/RLC bandwidth allocation at user equipment (UE), Iu, or Uu interface utilization level, topology specific statistics information and the like as usable by the TPM function to establish intelligent rule sets.

In accordance with one or more embodiments, systems (e.g., mobile specific implementations) may provide different options for interconnection between a DPI module and the UTRAN. One implementation includes the DPI module being installed above the GGSN (in line with the Gi interface) with tunneling in or out of band to communicate to the RAN. Another implementation may position the DPI module south of the SGSN with B2BUA signaling interception. Another implementation is a GGSN interface Gx connected implementation. Yet another implementation connects the DPI module via an Sd interface to a policy, charging, and rules function (PCRF) which then connects to Gx at the GGSN.

In accordance with embodiments, systems may realize control at the edge network by providing a RRC/RLC/MAC enhancement to address both user dataflow control, and signaling control; and provide over-the-air spectrum or time allocation manipulation (i.e., for either TDD or FDD systems).

Figure 5:
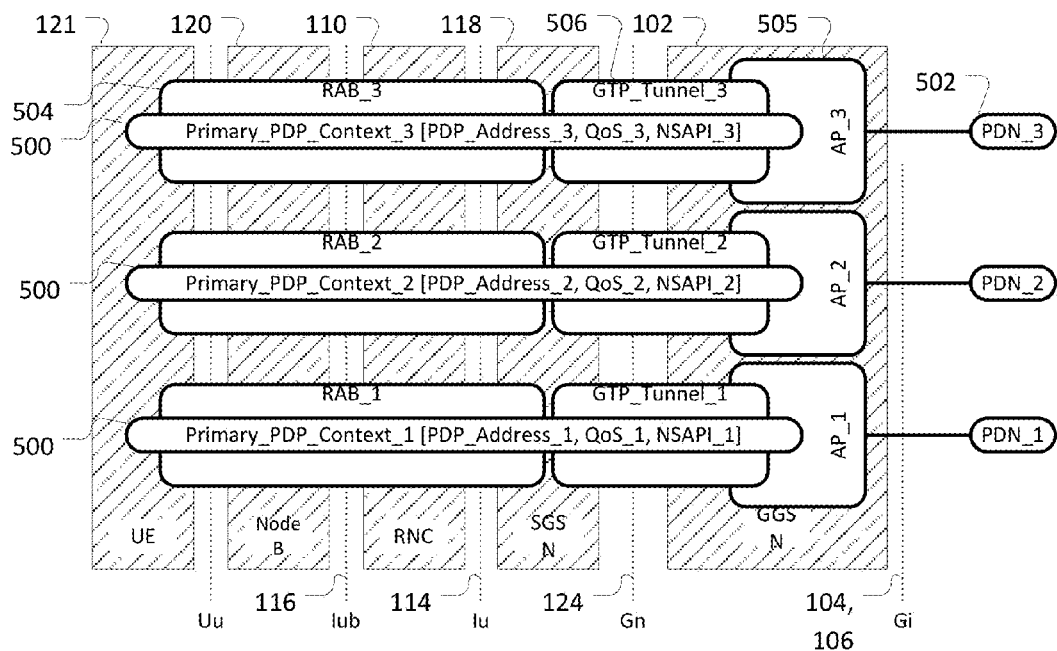
FIG. 5 is a diagram of end to end QoS tunnels established/associated with a packet data protocol (PDP) context for each user data flow from user equipment to the internet via a respective public data network (PDN) interface in accordance with embodiments of the present disclosure.

Embodiments disclosed herein may be used in, for example, but not limited to, a 3G universal mobile telecommunications system (UMTS) mobile environment. For example, FIG. 5 illustrates a diagram of end to end QoS tunnels established/associated with a packet data protocol (PDP) context 500 for each user data flow from user equipment 121 (e.g., a mobile terminal) to the internet via a respective public data network (PDN) interface 502 in accordance with embodiments of the present disclosure. In this example, existing QoS mechanisms may be modified, but reach down to the RAN edge at a radio access bearer (RAB) 504. The UMTS may provide end to end QoS management. The PDP context may establish traffic flow template (TFT) with QoS attributes, a GTP tunnel 506 for SGSN to GGSN flows, and RAB for UTRAN flows. The UTRAN RAB 504 may be modified to enable TPM control at the edge. SGSN may initiate the RAB assignment. RRC may be used to establish, maintain, and release RAB 504 within UTRAN. The end to end QoS tunnels enable an IP connection between the UE 121 and the GGSN 102, where the GGSN 102 provides IP router functionality to hand off to the internet at an access point 505. At each logical access point 505, handoff may occur to IP routed networks. These networks may be privately managed or publicly accessible. Each UE may have multiple QoS tunnels established via PDP contexts 500 routing through multiple access points 505. Each QoS tunnel creates a path through which IP connections may pass traffic, generally to and from the UE 121. Each tunnel may be associated with a different application on the UE. Embodiments disclosed herein may adjust any one, several, or all of the QoS tunnels to achieve the congestion related traffic management.

Figure 6:
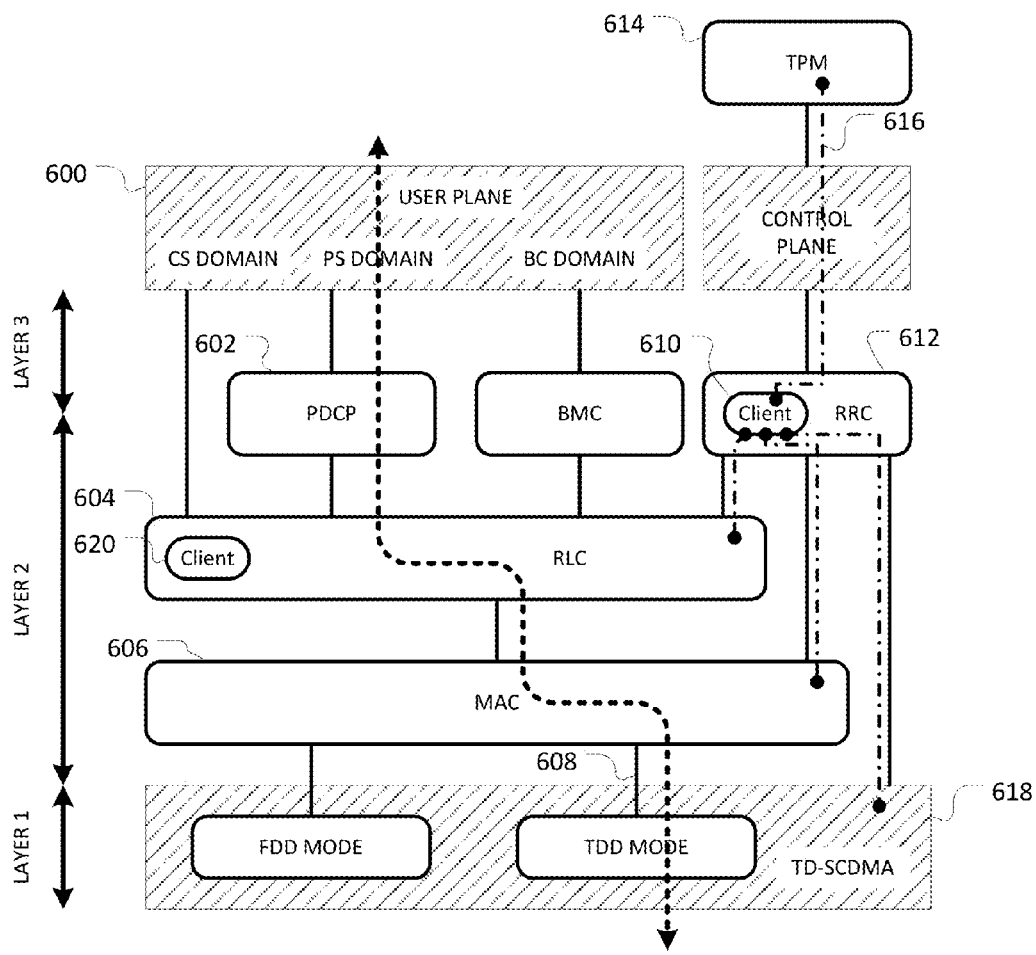
FIG. 6 is a diagram of a 3G wireless 3GPP structure of the protocol stack in accordance with embodiments of the present disclosure.

In another example, FIG. 6 illustrates a diagram of a 3G wireless 3GPP structure of the protocol stack in accordance with embodiments of the present disclosure. In this example, current protocols are established to manage the flow of bearer traffic, signaling and control traffic, and circuit-switched traffic. The IP flow generally causing edge RAN congestion, in the case of a TD-SCDMA network, flows through the user plane 600, via the packet data convergence protocol (PDCP) 602, through radio link control (RLC) 604, through the medium access control (MAC) layer 606, finally through the TDD mode radio bearer at 608. In this manner, IP traffic may flow from the internet 108 shown in FIGS. 1-4 through to the end user who accesses the information via the user equipment.

Further, for example, FIG. 6 illustrates an example 3GPP structure of the protocol stack, where a "linking" client 610 is installed at the RRC layer 612 in the protocol stack. This is the point in the edge network where the TPM function 614 in the upper core network can connect to and communicate dynamic policy enforcement changes via a communication interface at 616. The client 610 manages the control communication with the RLC 604, the MAC 606, and the TDD layer 618 to implement traffic control via manipulation of QoS configuration, as well as provide the TPM function 614 with information about the edge RAN network for the purpose of the TPM function 614 detecting RAN congestion events.

In accordance with one or more embodiments, modification of the RLC layer may be performed via a client addition 620 where capabilities are added for management of the QoS bandwidth reservation mechanisms depicted in FIG. 5.

Uu protocols may be transported over Iub as Uu stack is spread between RNC and nodeB. The flow of interest when user dataflow is controlled is the user IP data flow. TPM based control may be enforced on the user IP data flow, and may be enabled by RRC/RLC/MAC control. clients at 610 and 620 may provide an application programming interface (API) 616 to control the RRC/RLC/MAC. RAB control mechanisms include, but are not limited to, RRC—primary control signaling path to RLC, RLC—QoS maintenance, flow control, and MAC.

Figure 7:
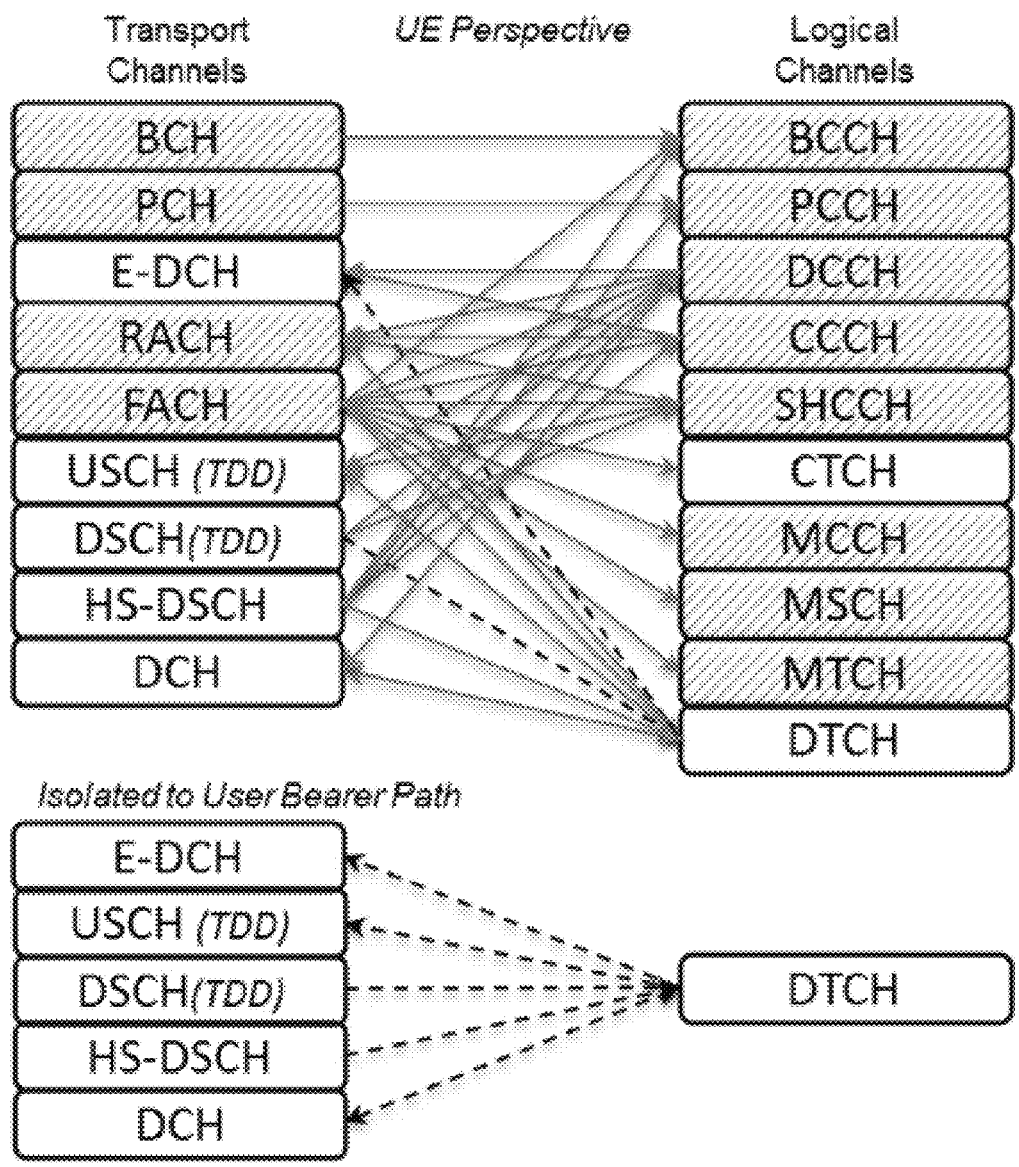
FIGS. 7 and 8 are diagrams that show example data flows that may be manipulated for a mobile application in accordance with embodiments of the present disclosure.
Figure 8:
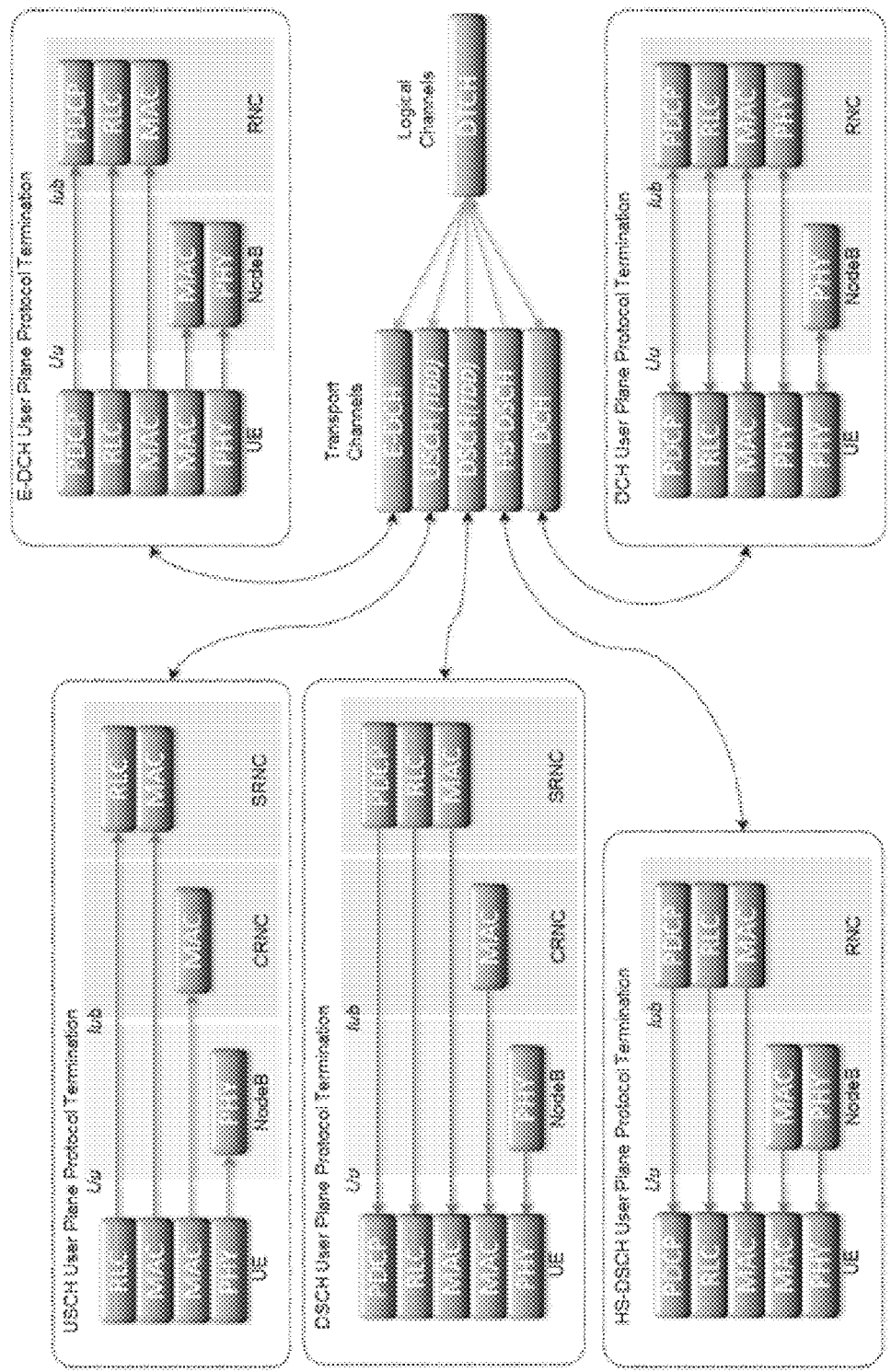

System and method embodiments are disclosed herein for manipulating data flows for a mobile application. For example, FIGS. 7 and 8 illustrate diagrams that show example data flows that may be manipulated for a mobile application in accordance with embodiments of the present disclosure. A specific implementation may target xCCH to manipulate signaling flows, or, target the DTCH for the user bearer data flow (i.e., application IP data flows to the internet). Referring to FIG. 4, for bearer traffic control, user flow may be throttled in suitable logical channels, and a determination of the location of the traffic management (RNC vs. NodeB) may be dependent on physical channel mapping.

In one or more embodiments, specific pieces of RAN equipment may be targeted to achieve the enhancement. In a user dataflow case, the RNC may be targeted for enhancement, and thereby, achieve manipulation of the RLC flow control mechanisms that implement the QoS shaping/policing of traffic.

In accordance with one or more embodiments of the present disclosure, FIG. 8 illustrates a diagram of a communications system in which systems and methods disclosed herein may be implemented. Referring to FIG. 8, RNC/NodeB modifications enable UTRAN/TPM interworking. Bearer path dynamic congestion control is provided at the edge. In an example, control plane signaling information may be sent to the TPM (RRC, RLC, and the like). Further, at the UTRAN RNC shown in FIG. 8, the following functionality may be implemented: modification of NodeB TD-SCDMA TDD (or other Uu over-the-air technology) bandwidth allocation; edge-aware data feedback to TPM algorithm (MAC bandwidth, etc.); and mobile signaling flow control.

Figure 9:
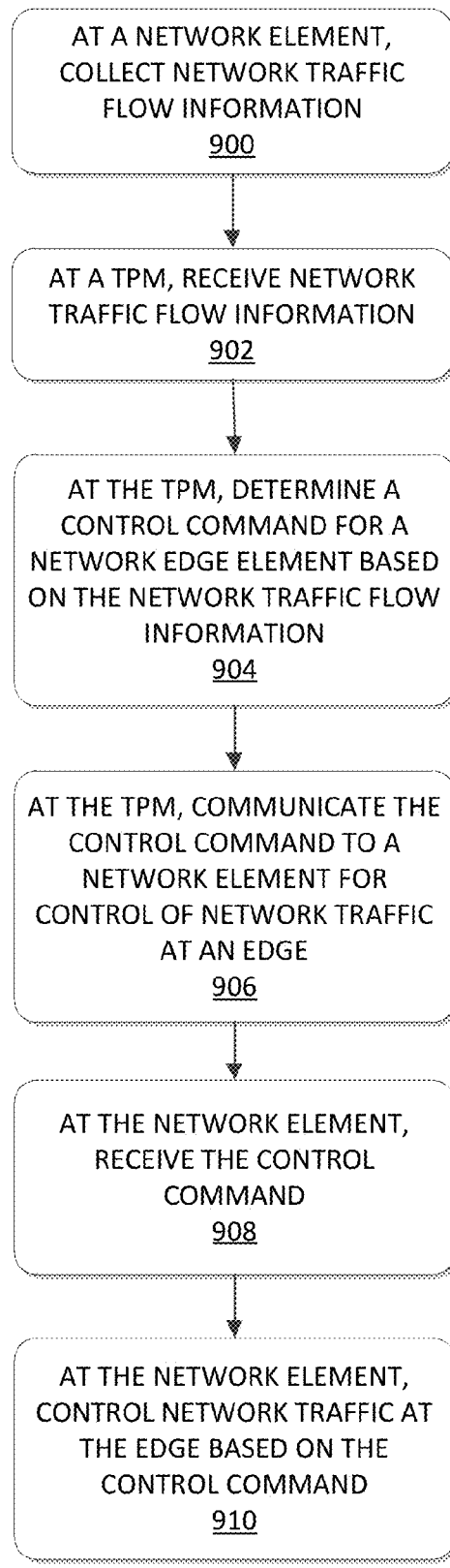
FIG. 9 is a flowchart of an example process for controlling network edge traffic in accordance with embodiments of the present disclosure.

FIG. 9 illustrates a flowchart of an example process for controlling network edge traffic in accordance with embodiments of the present disclosure. This example method is described as being implemented by the TPM function in the DPI module 100 and its client 112 shown in FIG. 1; however, the method may be implemented by any suitable components.

Referring to FIG. 9, the method includes collecting network traffic flow information at a network element (step 900). For example, the client 112 shown in FIG. 1 may collect radio congestion status information and user status information of one or more of the user equipment 121 in real time. The information may subsequently be communicated to the DPI module 100 via the communication link 122.

The method of FIG. 9 includes receiving the network traffic flow information (step 902). For example, the TPM function of the DPI module 100 may receive the network traffic flow information from the client 112 and/or other client(s) distributed within network elements of FIG. 1. Further, for example, the TPM function may receive IP flow information communicated between its position between the packet core network and the internet. The method may also include determining a control command for a network edge element based on the network traffic flow information (step 904). For example, the client 112 may indicate to the TPM system 100 that congestion exists on an Iub link 116 that it manages to the RAN. The TPM system 100 is user, device, and RAN topology aware and determines that congestion can be alleviated by adjusting a user's application IP allocated PDP context 500, and/or the user's device total use of IP traffic, and/or the RAN segment itself. In another example, the TPM system 100 may collect congestion information over time from the RAN equipment, such as via client 112 or client 400, or via inspection of traffic on the Gi interface 104 or the Gn interface 302, and use this information to determine time of day/day of week congestion events, devices prone to causing congestion, applications prone to causing congestion, and/or users prone to causing congestion. In these examples, depending on the network implementation the TPM system 100 receives information over interfaces 122, 128, 132, 306, and/or 402 thereby gaining RAN specific awareness of user, device, application and network topology. Further, the method includes communicating the control command to a network element for control of network traffic at an edge (step 906). For example, the control command may be communicated to the client 112.

The method of FIG. 9 also includes receiving the control command at the network element (step 908). For example, the client 112 may receive the control command from the TPM function at the DPI module 100. The method also includes controlling network traffic at the edge based on the control command (step 910). For example, network traffic can be controlled at the edge by shaping and policing algorithms in the TPM system 100 where known IP flows correlated to the cause of congestion (such as RAN element, UE device, user, or application) are manipulated to remove the congestion being communicated by the client 112. In another example, the client 112 or client 400 may receive a command to adjust the permitted QoS for a particular IP flow via manipulation of the PDP context 500. In another example, the client 112 may receive a command to shape or police traffic at the edge element. In another example, the client 112 or client 400 may receive a command to reject new UEs from joining the network, and/or close down IP flows on existing UEs on the network. In these examples, manipulation of the network signaling and traffic may be performed at different points in the network hierarchy, under command of the TPM system 100 as is best suited to remove the congestion in certain network elements or interfaces between elements.

It is noted that in accordance with embodiments of the present disclosure, DPI/TPM equipment may be application aware. It may use congestion information, correlated with which application is flowing over a specific IP flow, to go down to the RAN edge and tell that edge aware device to slow down that particular flow. In this manner, the application awareness may be combined with edge-awareness (e.g., congestion notification) and edge-shaping (e.g., edge manipulation of the IP flow in question, say, by PDP context/QoS manipulation) for improving traffic and signaling management.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for controlling network edge traffic, the method comprising: receiving network traffic flow information from a client at a Radio Network Controller (RNC) network element in a Radio Access Network (RAN); determining a control command for a network edge element within the RAN, the control command being based on the network traffic flow information; and communicating the control command to the client for control of network traffic at the RAN.

2. The method of claim 1, wherein the network traffic flow information comprises at least one of: information regarding Medium Access Control (MAC) or Radio Link Control (RLC) bandwidth allocation at user equipment, interface utilization level information, or topology specific information.

3. The method of claim 1, wherein receiving network traffic flow information comprises receiving internet protocol (IP) flow information at a network element positioned between a packet core network and the internet.

4. The method of claim 3, wherein determining a control command comprises determining a command for radio access network (RAN) bandwidth allocation based on the IP flow information.

5. The method of claim 1, wherein receiving network traffic flow information comprises receiving one of radio congestion status information and user status information associated with a plurality of user equipment, and wherein determining the control command comprises determining the control command based on the one of radio congestion status information and user status information.

6. The method of claim 1, wherein receiving network traffic flow information comprises receiving network traffic flow information via one of a direct internet protocol (IP) communication link and a predefined communication protocol.

7. The method of claim 1, further comprising establishing communication with a client at the network element, wherein receiving network traffic flow information comprises receiving network traffic flow information from the client of the network element, and wherein communicating the control command comprises communicating the control command to the client of the network element.

8. A method for controlling network edge traffic, the method comprising: at a first Radio Network Controller (RNC) network element within a Radio Access Network (RAN): communicating network traffic flow information to a second network element outside the RAN; receiving a control command from the second network element, wherein the control command is generated based on aggregated network traffic flow information; and controlling network traffic at the RAN based on the control command.

9. The method of claim 8, further comprising collecting the network traffic flow information in real time, and wherein communicating network traffic flow information comprises communicating the network traffic flow information to the second network element in real time.

10. The method of claim 8, wherein the second network element is positioned between a packet core network and the internet.

11. The method of claim 8, wherein communicating network traffic flow information comprises communicating internet protocol (IP) flow information to the second network element.

12. The method of claim 8, wherein the control command specifies radio access network (RAN) bandwidth allocation.

13. The method of claim 8, wherein communicating network traffic flow information comprises communicating one of radio congestion status information and user status information associated with a plurality of user equipment.

14. The method of claim 8, wherein communicating network traffic flow information comprises communicating network traffic flow information via one of a direct internet protocol (IP) communication link and a predefined communication protocol.

15. A computing device for controlling network edge traffic, the computing device comprising a processor and a memory, the memory comprising computer program code to cause the computing device to: receive network traffic flow information from a Radio Network Controller (RNC) network element within a Radio Access Network (RAN); determine a control command for a network edge element based on the network traffic flow information; and communicate the control command to the RNC for control of network traffic at the RAN.

* * * * *